May 18, 1954 G. CAMPEAU 2,678,704
INERTIA RESPONSIVE SHOCK ABSORBER
Filed Feb. 25, 1952
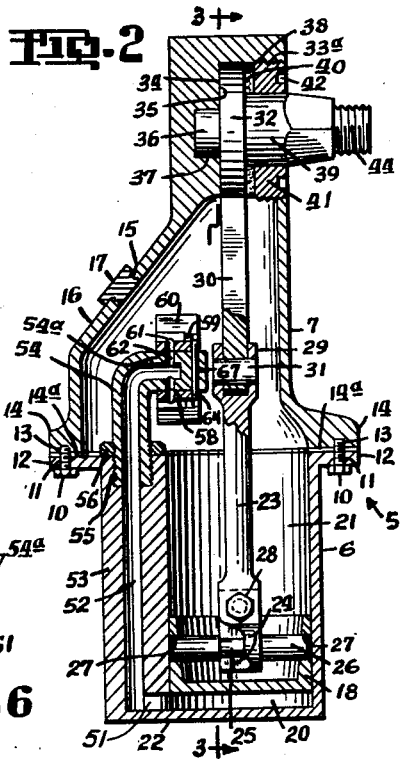
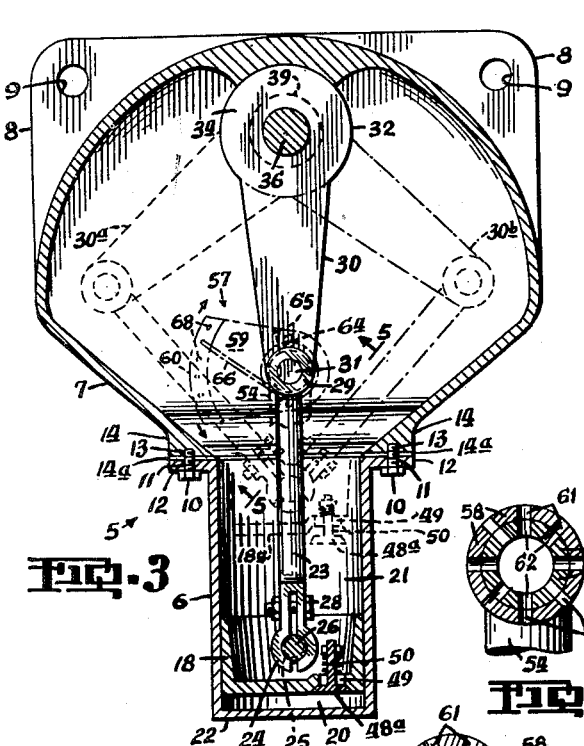
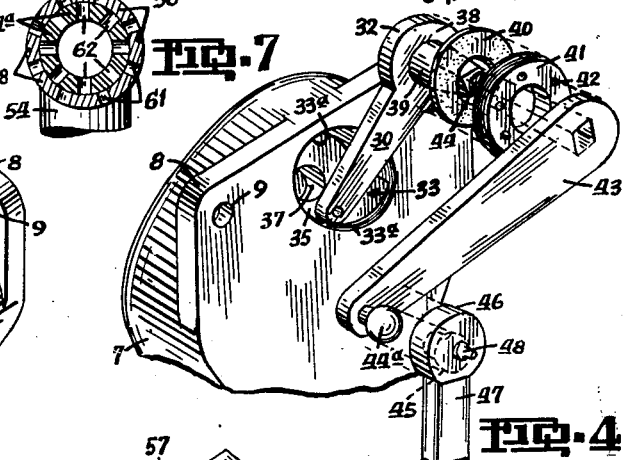
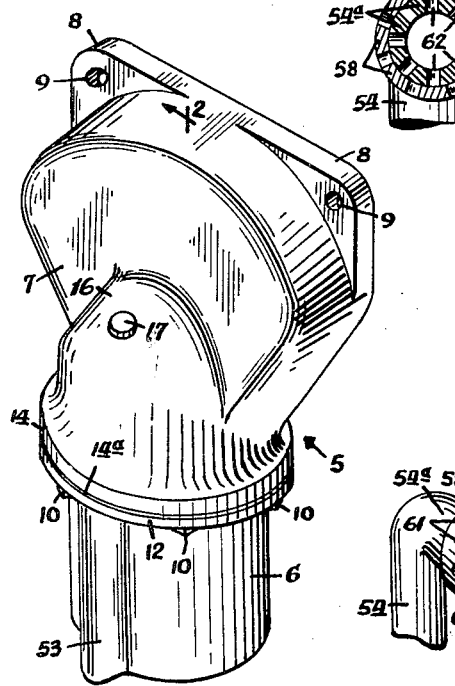
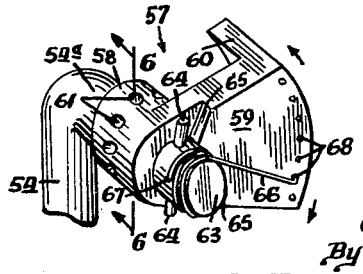
Inventor
Georges Campeau
By Fetherstonhaugh & Co
Attorneys Patented May 18, 1954

2,678,704

UNITED STATES PATENT OFFICE 2,678,704

INERTIA RESPONSIVE SHOCK ABSORBER

Georges Campeau, Montreal, Quebec, Canada

Application February 25, 1952, Serial No. 273,228

5 Claims. (Cl. 188—88)

This invention relates to new and useful improvements to automotive or other vehicular shock absorbers, and more particularly, pertains to shock absorbers of the piston-operated, fluid-displacing type.

The primary object of my invention is to provide a novel vehicular shock absorber capable of arresting rebounding action of a vehicle upon its springs.

Another object is to provide a vehicular shock absorber with a novel, rotary inertia, oil-flow check valve designed to regulate the rate and amount of displacement of the cushioning liquid.

Another object of my invention is to provide an improved shock absorber capable of permitting a small degree of vertical movement of the axle relative to the body of a vehicle before any cushioning liquid is displaced within the absorber.

A further object is to provide a novel simply constructed and easily assembled vehicular shock absorber wherein all points of division are strategically located, facilitating assembly, disassembly, and any machining required within.

A still further object of my invention is to provide a novel means for adjusting the checking tension of the oil-flow check valve.

Other objects and features of my invention will become more apparent upon reference to the accompanying drawing wherein:

Fig. 1 is a perspective view of my improved shock absorber.

Fig. 2 is a cross-sectional view taken substantially along line 2—2 of Fig. 1.

Fig. 3 is a cross-sectional view taken along line 3—3 of Fig. 2.

Fig. 4 is a fragmentary view of the upper rear portion of my shock absorber, and showing an exploded view of the rock arm and its component parts, the rock arm being removed from the shock absorber housing for sake of clarity.

Fig. 5 is a perspective view of the rotary inertia check valve taken approximately along line 5—5 of Fig. 3.

Fig. 6 is a cross-sectional view taken along line 6—6 of Fig. 5.

Fig. 7 is a sectional view similar to Fig. 6 except that the outer casing sleeve is revolved to close the alignment of the exhaust ports.

Referring more particularly to the drawing, 5 indicates generally my shock absorber, which comprises a lower cylinder 6 and an upper, fan shaped housing 7. Projecting outwardly from said housing 7 are flanges 8 having holes 9 through which bolts (not shown) secure said shock absorber to an automobile or like vehicular body. Upper housing 7 is secured to lower cylinder 6 by means of bolts 10 passed through holes 11 in a flange 12 of lower cylinder 6 and being threadedly received in recesses 13 of a co-operating flange 14 of upper housing 7. A gasket 14a of suitable material prevents leakage of cushioning fluid introduced into the shock absorber through an opening 15 in an inclined sidewall 16 of upper housing 7 (see Fig. 2). A plug 17 threadedly closes opening 15.

A reciprocating piston 18 divides cylinder 6 into a lower chamber 20 and an upper chamber 21. An integrally formed, wall 22 defines the lower extremity of lower chamber 20, while the opposing, upper end of cylinder 6 is open to permit passage therethrough of a piston rod 23. It will be noted that cylinder 6 has its open end secured to housing 7 so that the integrally formed end wall 22 of the cylinder is remote from the connection to the housing. Piston 18 is axially arranged in the cylinder so that its compression stroke is directed towards the integrally formed end wall 22. Thus it will be seen that the compression side of the cylinder, that is, chamber 20 is of one piece construction. This has considerable advantage over the type of cylinder in which the compression side is fitted with a removable cap. With applicant's arrangement there is no possibility of leakage in the area of the cylinder where the forces of compression are the greatest.

A split collar 24, forming the lower end of piston rod 23 rotatably encases a central portion 25 of a pin 26 journalled in openings 27—27 of piston 18. To prevent any lateral displacement of piston rod 23 upon pin 26, said central portion 25 is of a slightly smaller diameter than that of pin 26. To permit assembly or disassembly of rod 23 upon or from pin central portion 25, the clamping effect of the split collar 24 is adjustable by lock nut 28.

At the opposite end of piston rod 23, a yoke 29 is detachably secured to one end of a rock arm 30 by a pin 31. Pin 31 is removable only for assembly and dis-assembly and is of a fit snug enough to permit retainance, yet loose enough to allow free movement of the enjoined rock arm and piston rod.

The opposite end of rock arm 30, is circular, as indicated at 32, and is received in a well 33. One side surface 34 of said circular portion 32 abuts in face-to-face relation against wall 35 of receiving well 33. The circular portion 32 of rock arm 30 is provided with a trunnion 36 which is received in a bearing well 37 in wall 35. The opposite surface 38 of circular portion 32 is provided with a trunnion 39. The circular portion 32 of rock arm 30 is retained in well 33 by a plug 41 threadedly received in the well about trunnion 39. A ring-type bearing 40 is fitted around trunnion 39 between circular portion 32 and plug 41. Plug 41 is provided with tool-engaging recesses 42 to permit installation and removal. Through the opening 33a resulting from removal of plug 41 and bearing 40, insertion or removal of rock arm 30 is facilitated, as shown to advantage in Fig. 4 of the accompanying drawings. The outward end of trunnion 39, is tapered and squared to receive a correspondingly apertured arm 43. Trunnion 39 is provided with a threaded extension 44 which receives a lock nut (not shown) for retaining arm 43. The opposite end of arm 43 carries a ball 44a which is received in a corresponding ball socket 45 located in one end 46 of a push rod 47. The ball and socket are lubricated by means of a grease fitting 48. This method of linkage between arm 43 and push rod 47 is preferable, although replaceable by any other suitable connection. The push rod 47 is connected at its opposite end to the axle of a vehicle in any suitable manner (not shown).

Vertical movement of a vehicular axle rotates arm 43 through push rod 47, and rotation of arm 43, by its secured linkage to rock arm 30 via trunnion 39 and circular portion 32, rotates rock arm 30 either to a position 30a or 30b, depending on whether the axle is raised or lowered. Any displacement of rock arm 30 from its normal central position actuates piston 18 in a reciprocating action within cylinder 6. Small inequalities in road surface tend to rotate arm 30 only a few degrees of angular magnitude. Since the arc travel of rock arm 30, rotated these few degrees, is in a lateral direction, very little longitudinal movement is exerted upon piston 18. These inequalities effect no consequential rebound of the auto body upon the springs, nor do they substantially displace an oil check valve 57, hereinafter described. With the valve 57 undisturbed, a freedom of fluid flow is maintained resulting in free movement of piston 18 without interfering with the vehicle spring resiliency.

If, however, a large cavity or bump is struck, raising or lowering the vehicle axle greatly, rock arm 30 is rotated to position 30a or 30b, pulling piston 18 approximately to position 18a, as shown in dotted lines in Fig. 2. When piston 18 is so moved, displacement of fluid contained in fan-shaped housing 7 and in chamber 21 of cylinder 6 forces open a normally closed spring-closed valve 48a seated in the head surface of piston 18. This fluid passes through exhaust ports 49 circumferentially spaced around valve stem 50 of valve 48a and is contained in lower chamber 20 of cylinder 6.

When the axle is returning to its normal position, rock arm 30, through its linkages, reverses its swing and thus extends piston 18 to its original lowered position. In so returning, valve 48a closes and the liquid in lower compartment 20 is forced through exhaust port 51 located in the side walls of cylinder 6. Exhaust port 51 opens into one end of a fluid passage 52 situated in a thickened portion 53 of the side wall of lower cylinder 6.

At the opposite end of passage 52 a vertically extending fluid passage tube 54 has one end threadedly received in a corresponding recess 55 in the outer end of thickened wall 53. A lock nut 56 secures tube 54 within recess 55 against rotation. The free end of tube 54 is bent at right-angles to provide a horizontal extension 54a.

Fitted over the fluid passage tube extension 54a is a weighted, spring-counterbalanced, rotary valve 57. This valve 57 is co-axial with tube extension 54a and comprises generally a sleeve 58, arm 59, and weight 60. Spaced through said sleeve 58 is a row of fluid exhaust ports 61 corresponding with like ports 62 in fluid tube 54. A closed end wall 63 of tube extension 54a permits fluid passage only through said ports 61, 62. Through end wall 63 a pin 64 is passed and permits only a specified degree of revolution of the valve 57 about tube extension 54a by butting against shoulders 65 of valve arm 59.

As heretofore mentioned, when a bump or cavity is struck by the vehicle, the vehicle axle either rises or drops. The vehicle body is thus forcibly and rapidly raised (or lowered) carrying the attached shock absorber housing with it. When said shock absorber housing is displaced, the inertia of valve 57 causes it to lag behind, thus revolving about tube extension 54a and thereby closing exhaust ports 61 as shown in Fig. 7. A counter-balancing spring 66 returns the displaced valve to its normal open-port position and maintains it in said position until again shock displaced. This counter-balancing effects a desired, retarded, gradual opening of the exhaust ports 61, 62. By this retarded opening, these ports permit only a limited flow of fluid from the compression chamber 20 to the secondary chamber above the piston 18. By constricting this fluid flow the return of the axle to its normal position is retarded, resulting also in a gradual return of the vehicle body to its normal position through the medium of the shock absorber.

Spring 66 is anchored at one end to tube extension 54a, said end of spring 66 extending into a transverse opening 67 in the thickened portion of end wall 63. The intermediate portion of spring 66 encircles the tube extension 54a and its free end is selectively receivable in one of a plurality of recesses 68. Recesses 68 are radially arranged with respect to the axis of tube extension 54a. Adjustability of the valve spring tension is effected by selective insertion of said free end of spring 66 in another of the recesses 68.

If spring tension were too weak, the rotary valve would not centralize itself, leaving the exhaust ports closed and causing the shock absorber to be inoperative. However, if the tension were too great, the exhaust ports would open too quickly causing too rapid flow of fluid from one chamber into another and thereby resulting in the piston extending without resistance, permitting the vehicle body to rebound upon its springs. These defects may be overcome by said selective adjustment of the free end of spring 66 to increase or decrease the spring tension.

It should be understood that while this is a preferred embodiment of my invention, other modifications may be resorted to within the scope and spirit of the appended claims.

What I claim is:

1. A shock absorber for vehicles, comprising a fluid containing housing rigidly connectable to a vehicle body and provided with an opening, a cylinder having an open end secured to said housing and registering with said housing opening whereby the interior of the cylinder is placed in communication with the interior of the housing, a piston axially movable within said cylinder, means for operably connecting said piston to a relatively movable part of said vehicle, said piston dividing said cylinder into a primary chamber at the side of the piston remote from said housing and a second chamber at the other side of the piston in direct communication with said housing, said piston being provided with a fluid passage between said primary and second chamber, a valve normally closing said passage through the piston and operable to permit fluid flow between the chambers when the piston is retracted toward said housing, a second fluid passage from said primary chamber to said housing, said second fluid passage comprising, in part, a cylindrical tube closed at one end and having radially extending ports adjacent its closed end, a weighted, counter-balanced, rotary inertia valve adapted to oscillate about the axis of said cylindrical tube and having exhaust ports normally aligned with said radially extending ports in said tube, said valve being rotatable by forces of inertia to disrupt the alignment of said exhaust ports, and means operable for returning said valve to open exhaust port alignment.

2. A device as set forth in claim 1, in which said means for connecting said piston to said relatively movable part comprises an oscillatable shaft connected at one end to the said relatively movable part and a toggle linking said shaft to said piston for axial movement of said piston in response to oscillation of said shaft.

3. A device as set forth in claim 1, in which said means for returning said inertia valve comprises a counter-balancing spring secured at one end to said cylindrical tube and at the other end to said valve.

4. A device as set forth in claim 3, including means carried by said inertia valve for selective connection of the said other end of said spring for adjustment of the tension of said counter-balancing spring.

5. A device as set forth in claim 3, including means for adjusting the tension of said counter-balancing spring which comprises a plurality of circumferentially spaced apertures at the remote end of said valve into one of which the free end of said spring is selectively secured, adjustability being effected by repositioning said spring end into other of the spaced apertures.

References Cited in the file of this patent

UNITED STATES PATENTS

| Number | Name | Date |
| --- | --- | --- |
| Re. 11,767 | Lash | Aug. 29, 1899 |
| 1,281,079 | Sears | Oct. 8, 1918 |
| 1,515,863 | Kirby | Nov. 18, 1924 |
| 1,818,140 | Lang | Aug. 11, 1931 |
| 2,017,963 | Griswold | Oct. 22, 1935 |